United States Patent
Lloyd et al.

(10) Patent No.: US 12,212,685 B2
(45) Date of Patent: Jan. 28, 2025

(54) CONSENT MANAGEMENT

(71) Applicant: Smarter Contracts Ltd., London (GB)

(72) Inventors: Wayne Lloyd, London (GB); James Radley, London (GB); Neelam Patel, London (GB); Ben Sheedy, London (GB)

(73) Assignee: Smarter Contracts Ltd., London (GB)

( * ) Notice: Subject to any disclaimer, the term of this patent is extended or adjusted under 35 U.S.C. 154(b) by 353 days.

(21) Appl. No.: 17/539,804

(22) Filed: Dec. 1, 2021

(65) Prior Publication Data

US 2022/0173913 A1     Jun. 2, 2022

(30) Foreign Application Priority Data

Dec. 1, 2020 (GB) ..................... 2018919

(51) Int. Cl.
*H04L 9/32* (2006.01)
*G06F 21/62* (2013.01)

(52) U.S. Cl.
CPC ........ *H04L 9/3247* (2013.01); *G06F 21/6218* (2013.01)

(58) Field of Classification Search
CPC ... H04L 9/0841; H04L 9/0861; H04L 9/3247; H04L 9/50; H04L 63/0428; H04L 63/123;
(Continued)

(56) References Cited

U.S. PATENT DOCUMENTS 11,063,760 B2 *   7/2021 Subba ................... H04L 9/085
11,138,598 B2 * 10/2021 Yadav .................. H04L 9/0637
(Continued)

FOREIGN PATENT DOCUMENTS

WO     2020071978 A1    4/2020

OTHER PUBLICATIONS

European Search Report in reference to co-pending European Application No. 21211827.7 filed Dec. 1, 2020.
(Continued)

*Primary Examiner* — Amare F Tabor
(74) *Attorney, Agent, or Firm* — Dinsmore & Shohl LLP

(57) ABSTRACT

There is provided a computer-implemented method for a first party to control permission for access to first party information to a second party while preserving privacy, the method comprising the following steps taken by the first party at first party computing apparatus: establishing with the second party a set of information classes for first party information to be provided to the second party and establishing permitted use for the first party information in the set of information classes; providing a first party consent to the permitted use for the first party information in the set of information classes, encrypting the first party consent for inspection limited to the first party and the second party, and providing the first party consent to the second party in a first party digitally signed consent grant structure for the second party to decrypt, validate and sign the first party consent and for a consent validating party to store the first and second party digitally signed consent grant structure on a blockchain. There is also provided a computer-implemented method for a second party to obtain permission from a first party for access to first party information while preserving privacy. There is also provided a computer-implemented method for a consent validating party to manage permissions given by a first party for access to first party information to a second party while preserving privacy.

18 Claims, 9 Drawing Sheets

(58) Field of Classification Search
CPC ... H04L 63/061; G06F 21/645; G06F 21/604; G06F 21/6218
USPC .......................................................... 713/176
See application file for complete search history.

(56) References Cited

U.S. PATENT DOCUMENTS

| | | | |
|---|---|---|---|
| 11,210,426 B2 * | 12/2021 | Yan | G06F 16/2474 |
| 11,238,170 B2 * | 2/2022 | Murdoch | H04L 9/3236 |
| 11,449,585 B2 * | 9/2022 | Lindeman | G06F 21/645 |
| 11,483,143 B2 * | 10/2022 | Tola | H04L 9/50 |
| 2019/0199531 A1 * | 6/2019 | Staples | H04L 63/102 |
| 2019/0220859 A1 * | 7/2019 | Weight | G06Q 20/10 |

OTHER PUBLICATIONS

Grishin, et al., "Data privacy in the age of personal genomics", Nature Biotechnology, Nature Publishing Group, vol. 37, No. 10, pp. 1115-1117, XP36897241, Sep. 19, 2019.
Rantos, et al., "ADvoCATE: A Consent Management Platform for Personal Data Processing in the IoT Using Blockchain Technology", SecITC, pp. 300-313, 2019.
Faber, et al., "BPDIMS: A Blockchain-based Personal Data and Identity Management System", Proceedings of the 52nd Hawaii International Conference on System Sciences, pp. 6855-6864, 2019.

* cited by examiner

CONSENT MANAGEMENT

CROSS-REFERENCE TO RELATED APPLICATIONS

This application claims priority under 35 U.S.C. § 119(a) to United Kingdom Patent Application No. GB2018919.7, filed Dec. 1, 2020, the entire contents of which are incorporated herein by reference.

TECHNICAL FIELD

The present invention relates to consent management. In particular, but not exclusively, the present invention relates to a method for a first party to control permission for access to first party information to a second party while preserving privacy.

BACKGROUND

Data protection and privacy is a growing concern as an increasing amount of personal data is being shared, either for a specific purpose or for generic data collection and pooling. One example of sharing personal data is in Open Banking, which provides protocols that facilitate providing financial providers with access to consumer financial information in connection with banking applications. It is desirable to ensure that appropriate technical measures are in place to guarantee that the personal data is protected before, during and after being shared. This involves secure transfer as well as access to the personal data.

There is a further need to not only protect personal data, but to provide data protection and privacy by design by minimising personal data processing, and to provide data protection and privacy by default by only processing data that are necessary, to an extent that is necessary and only storing data as long as is necessary. Accordingly, building computer systems and infrastructure for storing or accessing personal data securely presents a technical challenge.

A consent management platform is a technical tool that can be used for obtaining, storing and managing user consent for processing of personal data. Typically, a consent management platform involves three entities—the user, the data controller and the data processor. User consent can be obtained from the user via a consent request form to collect the user's data. If the user does not provide consent at this stage, the data controller can take no further action in collecting the user's data. If the user does provide consent, the data processor may collect and process the data on behalf of the data controller. Either way, the data controller often includes a consent manager that can store the status of the consent and a record of the user's consent decision.

The storage and management of consent decisions presents further technical challenges. For example, one major limitation of the current technological solutions is the lack of control over the granularity of consent grants. Another important limitation is the difficulty of handling dynamic changes of consent over time.

The present invention aims to overcome or at least partly mitigate one or more of the above-described problems.

SUMMARY OF THE INVENTION

According to an aspect of the present invention, there is provided a method fora first party to control permission for access to first party information to a second party while preserving privacy, the method comprising: the first party and the second party establishing a set of information classes for first party information to be provided to the second party and establishing permitted use for the first party information in the set of information classes; the first party providing a first party consent to the permitted use for the first party information in the set of information classes, the first party encrypting the first party consent for inspection limited to the first party and the second party, the first party providing the first party consent to the second party in a first party digitally signed consent grant structure; the second party decrypting and validating the first party consent, the second party providing the first party consent to a consent validating party in a first party and second party digitally signed consent grant structure; the consent validating party determining that the first and second party digitally signed consent structure is valid, and the consent validating party storing the first and second party digitally signed consent grant structure on a blockchain.

In embodiments, the method further comprises the first party establishing a set of consent event identifiers associated with providing the first party consent, the first party encrypting the set of consent event identifiers for inspection limited to the first party and the consent validating party, the first party including the encrypted set of consent event identifiers in the consent grant structure.

The consent grant structure may further comprise a time of consent and a period from the time of consent for which the consent is valid.

The first party information may comprise personal data associated with the first party.

Steps executed by the first party may be performed at a first party computing device.

In embodiments, the set of information classes and the permitted use are established in an application relating to provision of goods or services by the second party.

The application may relate to provision of goods or services by multiple second parties, and the determination of the set of information classes and the permitted use may relate to use by multiple second parties.

The first party may also provide the first party information in the set of information classes to the second party.

In embodiments, the first party does not provide the first party information in the set of information classes to the consent validating party.

In embodiments, the method further comprises either the first party or the second party providing a revoke grant structure revoking the consent grant structure, wherein the revoke grant structure identifies the consent grant structure and is encrypted by the revoking party for inspection limited to the first party and the second party and is digitally signed by the revoking party.

The revoke grant structure may further identify the storage of the first and second party digitally signed consent grant structure on the blockchain.

Encrypting data for inspection limited to the two parties may comprise establishing a symmetric key for use by the two parties using elliptic curve Diffie-Hellman key exchange.

Digital signing by a party may comprise elliptic curve digital signature.

The first party may use a plurality of private keys for encrypting and digital signing.

Each of the plurality of private keys may be generated by an iterative process from an original master private key.

A private key may be generated from a preceding private key by splitting the preceding private key into a first part and a second part, and by performing a first process to generate the first part of the private key and a second process to generate the second part of the private key.

One of the first process and the second process may be an XOR of the first part and the second part of the preceding master private key followed by a hash of the XOR, and the other of the first process and the second process may be a hash of the first part or the second part of the preceding master private key.

The method may further comprise regenerating private keys after the consent event, determining corresponding public keys from the private keys, and using the determined public keys to identify consent events.

According to a first aspect of the present invention, there is provided a computer-implemented method for a first party to control permission for access to first party information to a second party while preserving privacy, the method comprising the following steps taken by the first party at first party computing apparatus: establishing with the second party a set of information classes for first party information to be provided to the second party and establishing permitted use for the first party information in the set of information classes; providing a first party consent to the permitted use for the first party information in the set of information classes, encrypting the first party consent for inspection limited to the first party and the second party, and providing the first party consent to the second party in a first party digitally signed consent grant structure for the second party to decrypt, validate and sign the first party consent and for a consent validating party to store the first and second party digitally signed consent grant structure on a blockchain.

In embodiments, the method further comprises establishing a set of consent event identifiers associated with providing the first party consent, encrypting the set of consent event identifiers for inspection limited to the first party and the consent validating party, and including the encrypted set of consent event identifiers in the consent grant structure.

The consent grant structure may further comprise a time of consent and a period from the time of consent for which the consent is valid.

The first party information may comprise personal data associated with the first party.

Steps executed by the first party may be performed at a first party computing device.

In embodiments, the set of information classes and the permitted use are established in an application on the first party computing device relating to provision of goods or services by the second party.

The application on the first party computing device may relate to provision of goods or services by multiple second parties, and the determination of the set of information classes and the permitted use relates to use by multiple second parties.

The first party may also provide the first party information in the set of information classes to the second party.

In embodiments, the first party does not provide the first party information in the set of information classes to the consent validating party.

The method may further comprise the first party providing a revoke grant structure revoking the consent grant structure, wherein the revoke grant structure identifies the consent grant structure and may be encrypted by the first party for inspection limited to the first party and the second party and digitally signed by the first party.

The revoke grant structure may further identify the storage of the first and second party digitally signed consent grant structure on the blockchain.

Encrypting data for inspection limited to the first party and another party may comprise establishing a symmetric key for use by the first party and the other party using elliptic curve Diffie-Hellman key exchange.

Digital signing by the first party comprises elliptic curve digital signature.

The first party may use a plurality of private keys for encrypting and digital signing.

Each of the plurality of private keys may be generated by an iterative process from an original master private key.

A private key may be generated from a preceding private key by splitting the preceding private key into a first part and a second part, and by performing a first process to generate the first part of the private key and a second process to generate the second part of the private key.

One of the first process and the second process may be an XOR of the first part and the second part of the preceding master private key followed by a hash of the XOR, and the other of the first process and the second process may be a hash of the first part or the second part of the preceding master private key.

The method may further comprise the first party regenerating private keys after the consent event, determining corresponding public keys from the private keys, and using the determined public keys to identify consent events.

According to an aspect of the present invention, there is provided a computing apparatus for a first party, wherein the computing apparatus is adapted to perform the steps of the first aspect of the present invention as outlined above, wherein the steps are performed by the computing apparatus or for steps which require selection by the first party, by providing a user interface to the first party to make said selection.

According to a second aspect of the present invention, there is provided a computer-implemented method for a second party to obtain permission from a first party for access to first party information while preserving privacy, the method comprising the second party at second party computing apparatus: establishing with the first party a set of information classes for first party information to be provided to the second party and establishing with the first party permitted use for the first party information in the set of information classes; receiving from the first party a first party consent to the permitted use for the first party information in the set of information classes, wherein the first party consent is encrypted by the first party for inspection limited to the first party and the second party, the first party consent being provided in a first party digitally signed consent grant structure; decrypting and validating the first party consent, and providing the first party consent to a consent validating party in a first party and second party digitally signed consent grant structure, wherein the consent validating party is able to determine that the first and second party digitally signed consent structure is valid, and is further able to store the first and second party digitally signed consent grant structure on a blockchain.

In embodiments, the consent grant structure further comprises a time of consent and a period from the time of consent for which the consent is valid.

The set of information classes and the permitted use may be established in an application relating to provision of goods or services by the second party.

The first party information in the set of information classes may also be received from the first party.

The method may further comprise the second party providing a revoke grant structure revoking the consent grant structure, wherein the revoke grant structure identifies the consent grant structure and may be encrypted by the second party for inspection limited to the first party and the second party and digitally signed by the second party.

The revoke grant structure may further identify the storage of the first and second party digitally signed consent grant structure on the blockchain.

Encrypting data for inspection limited to the second party and another party may comprise establishing a symmetric key for use by the two parties using elliptic curve Diffie-Hellman key exchange.

Digital signing by the second party may comprise elliptic curve digital signature.

The second party may use a plurality of private keys for encrypting and digital signing.

The method may further comprise regenerating private keys after the consent event, determining corresponding public keys from the private keys, and using the determined public keys to identify consent events.

Each of the plurality of private keys may be generated by an iterative process from an original master private key.

A private key may be generated from a preceding private key by splitting the preceding private key into a first part and a second part, and by performing a first process to generate the first part of the private key and a second process to generate the second part of the private key.

One of the first process and the second process may be an XOR of the first part and the second part of the preceding master private key followed by a hash of the XOR, and the other of the first process and the second process may be a hash of the first part or the second part of the preceding master private key.

According to an aspect of the present invention, there is provided a computing apparatus adapted to perform the steps of any of the methods described above in respect of the second aspect of the present invention.

According to a third aspect of the present invention, there is provided a computer-implemented method for a consent validating party to manage permissions given by a first party for access to first party information to a second party while preserving privacy, the method comprising the consent validating party at consent validating party computing apparatus: receiving a first party consent from the second party, wherein the first party consent has been digitally signed by the first party and the second party to form a first and second party digitally signed consent structure, and wherein the first party consent comprises a set of information classes for first party information and permitted use for first party information established between the first party and the second party, the first party consent being encrypted by the first party for inspection limited to the first party and the second party; and the consent validating party determining that the first and second party digitally signed consent structure is valid, and the consent validating party storing the first and second party digitally signed consent grant structure on a blockchain.

In embodiments, the first party has established a set of consent event identifiers associated with providing the first party consent and the first party has encrypted the set of consent event identifiers for inspection limited to the first party and the consent validating party, and the consent validating party receives the encrypted set of consent event identifiers in the consent grant structure.

In embodiments, the consent validating party does not receive the first party information from the first party directly or indirectly.

Encrypting data for inspection limited to the consent validating party and another party may comprise establishing a symmetric key for use by the two parties using elliptic curve Diffie-Hellman key exchange.

According to an aspect of the present invention, there is provided a computing apparatus adapted to perform the method of the third aspect of the present invention to provide the functionality of a consent validating party.

Within the scope of this application, it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The present invention will now be described, by way of example only, with reference to the accompanying drawings, in which.

DETAILED DESCRIPTION

Embodiments of the present invention relate to a method for a first party to control permission for access to first party information to a second party while preserving privacy. The first party and the second party establish a set of information classes for first party information to be provided to the second party. The first party and the second party also establish permitted use for the first party information in the set of information classes.

The first party provides a first party consent to the permitted use for the first party information in the set of information classes, and the first party encrypts the first party consent for inspection limited to the first party and the second party. The first party provides the first party consent to the second party in a first party digitally signed consent grant structure.

The second party decrypts and validates the first party consent, and the second party provides the first party consent to a consent validating party in a first party and second party digitally signed consent grant structure.

The consent validating party determines that the first and second party digitally signed consent structure is valid, and the consent validating party stores the first and second party digitally signed consent grant structure on a blockchain. As a result, privacy is preserved for the first party and/or the second party. Embodiments of the present invention will now be described with reference to FIGS. 1 to 9.

Figure 1:
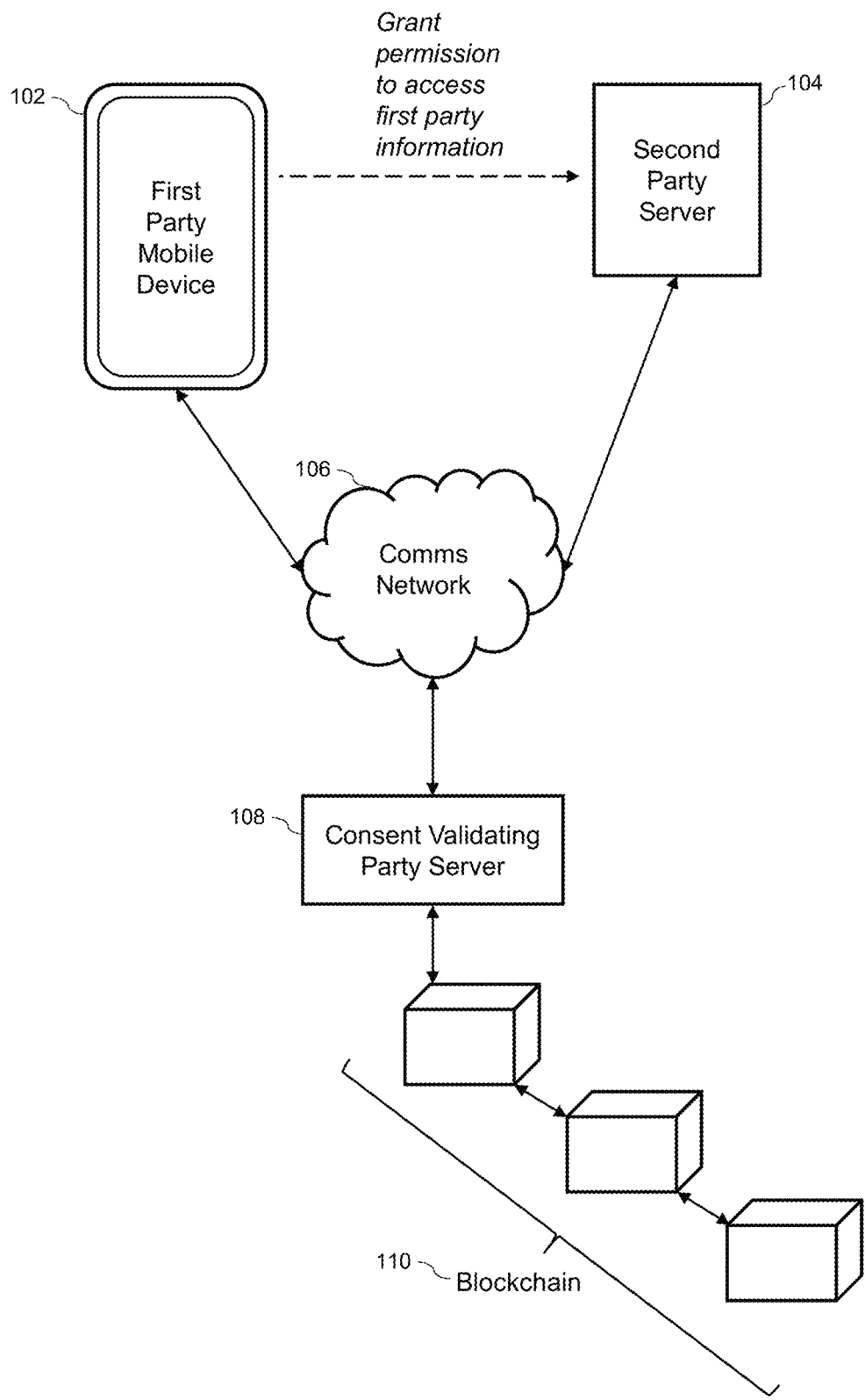
FIG. 1 is a schematic block diagram showing a system including a first party mobile device and a second party server in communication via a communications network, where a first party can grant permission to access first party information in accordance with embodiments of the present invention.

In accordance with a first embodiment of the present invention, the first party controls permission for access to first party information via a first party mobile device 102, e.g. a smart phone, as shown in FIG. 1. In this way, the first party is able to grant consent or permission to the second party to access the first party information. The second party provides operations via a second party server 104. The first party may be referred to herein as the user or the grantor, whereas the second party may be referred to herein as the client or the grantee. The consent or permission that is granted by the first party to the second party may be referred to herein as a 'consent', 'grant', 'grant transaction' or 'consent grant structure'. In alternative embodiments, the first party may control permission for access for first party information via a different computing device, e.g. a personal computer, a tablet or a smart watch.

The first party mobile device 102 and the second party server 104 are in communication with one another via a communications network 106. The first party mobile device 102 and the second party server 104 are also in communication with a consent validating party server 108 via the communications network 106. The consent validating party server 108 is in turn in connection with a blockchain 110.

Figure 2:
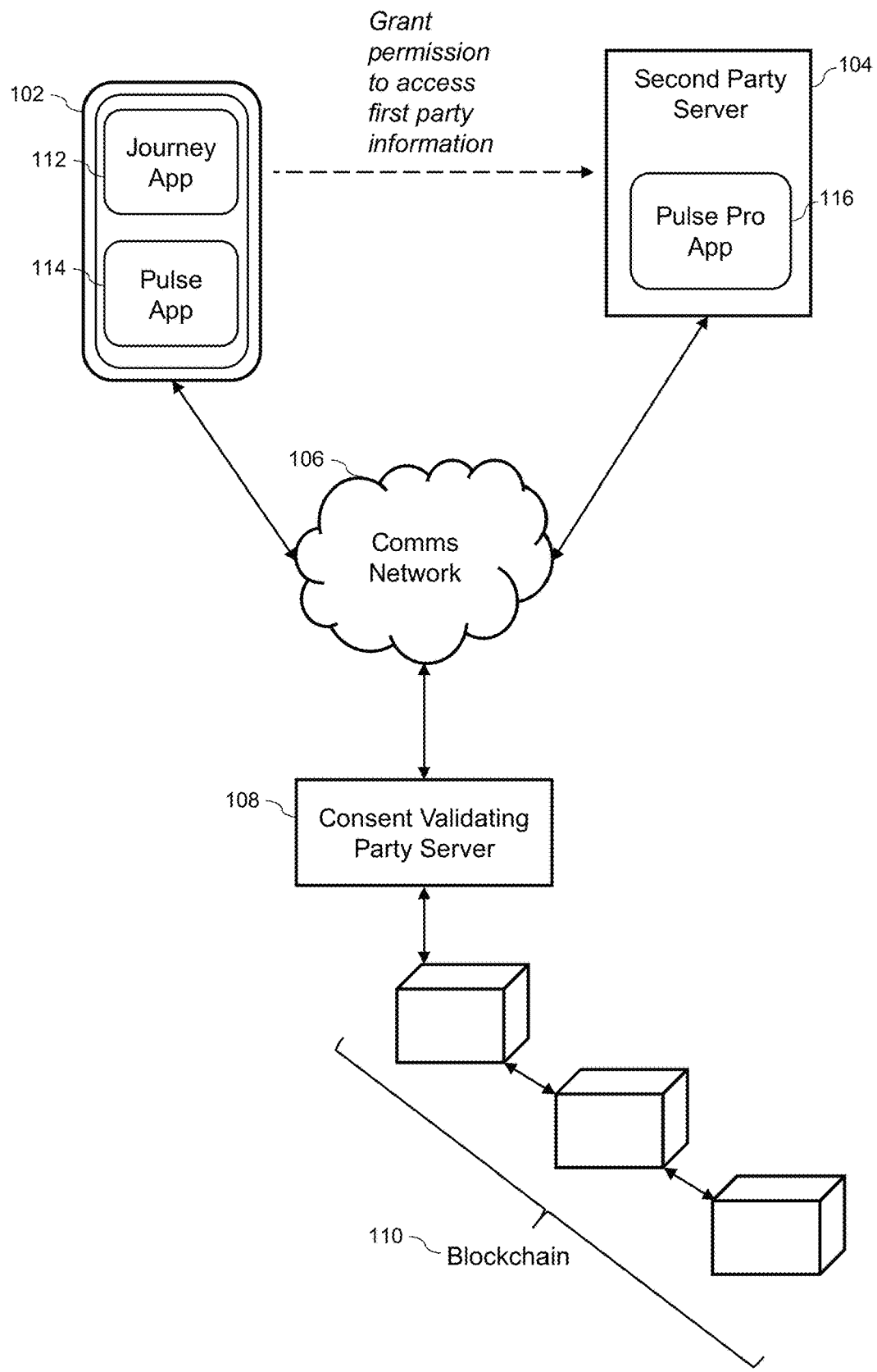
FIG. 2 is a schematic block diagram showing the system shown in FIG. 1 in further detail.

Several mobile applications or 'apps' may be installed on the first party mobile device 102 and the second party server 104. In the present embodiment, the first party mobile device 102 has a Journey App 112 and a Pulse App 114 installed thereon, and the second party server 104 has a Pulse Pro App 116 installed thereon, as shown in FIG. 2. The Pulse App 114, the Pulse Pro App 116, the consent validating party server 108 and the blockchain 110 together form a consent management platform, which may be referred to herein as the Pulse Platform or the Pulse system. In alternative embodiments, the functionality provided by the Pulse App and the Journey App in particular may be provided via a web browser or a desktop application.

Figure 3:
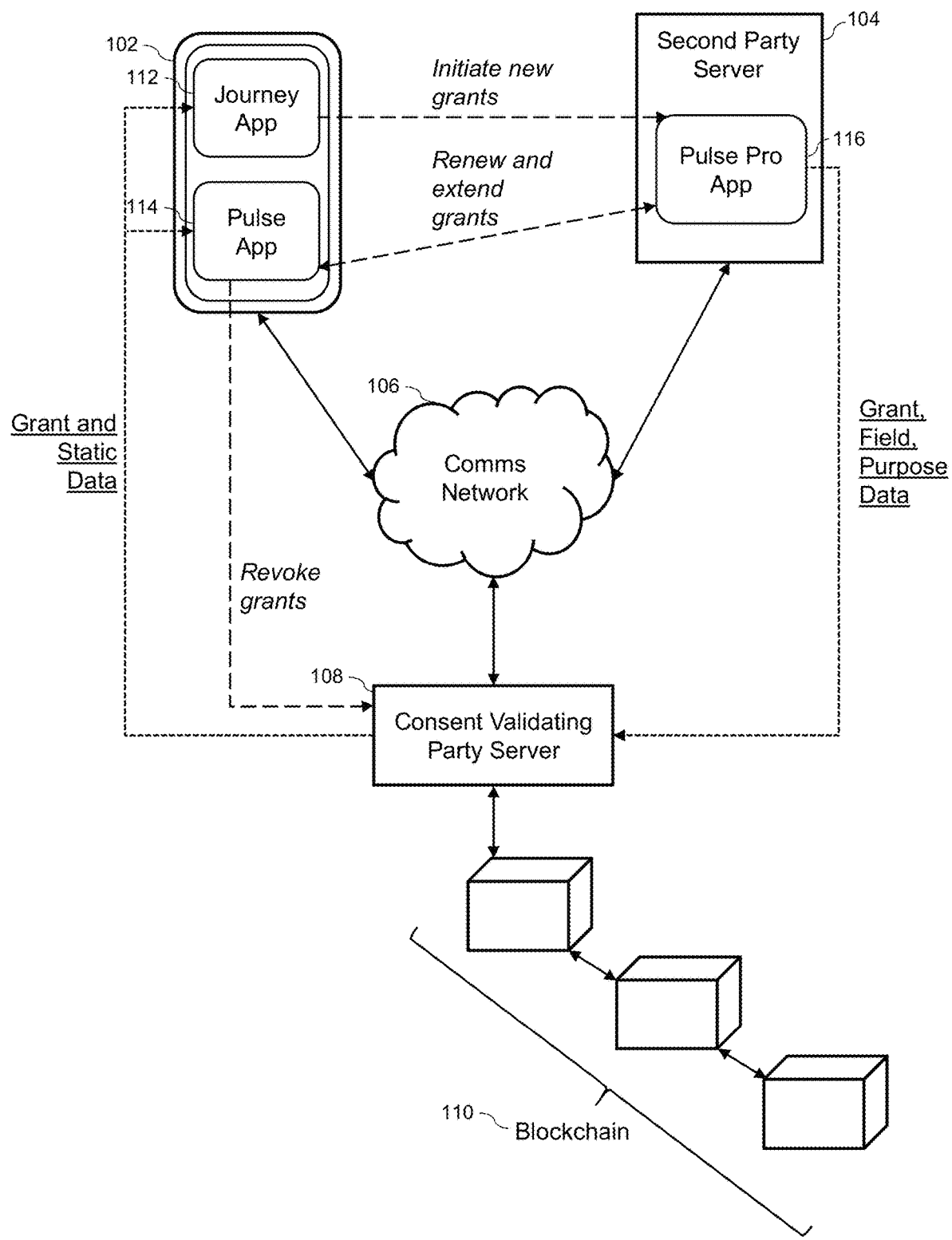
FIG. 3 is a schematic block diagram showing the system shown in FIGS. 1 and 2 in further detail.

In this embodiment the Pulse App 114 is a front-end user mobile application which allows the first party to manage all of their consents to access the first party information. In particular, the Pulse App 114 enables the first party to view, renew, extend and/or revoke any consents that have been granted, otherwise called 'grants' herein, through the Pulse Platform. This is illustrated in FIG. 3. In addition, the Pulse App 114 enables the first party to report any breaches of data. New grants are initiated by the Journey App 112, which is discussed in further detail below, and using the Pulse App 113 the first party is able to manage the consents that have been granted by the first party via the Journey App 112.

The Journey App 112 is a front-end user mobile application which supports specific user journeys—it is not specifically directed to managing user consents, but it may provide an entry into the consent management process. An example of a specific user journey may be buying a car, and this specific user journey could be supported by a Journey App 112 that is capable of searching for cars based on desired criteria. Another example of a specific user journey is finding a loan and this specific user journey could be supported by a Journey App 112 that is capable of searching for the cheapest loans. The Journey App 112 also enables the first party to initiate new grants. The Journey App 112 may therefore be the route for the first party to share personal data with one or more second parties—such as a group of possible vendors for a product or service. The Journey App 112 may also enable the first party to manage existing grants, e.g. to renew, extend or revoke existing grants that have been granted by the first party through the Journey App 112. It should be noted that the Journey App 112 is not the only possible route by which the Pulse system may become involved in the management of grants. For example, proprietary apps (to extend the existing example, from a specific car dealer or loan provider) may be provided with an appropriate hook to the Pulse system, by provision of an SDK or specific code to the providers of such proprietary apps or otherwise.

As mentioned above, the Pulse Pro App 116 is installed on the second party server 104. The Pulse Pro App 116, as shown in FIG. 3, enables the second party to interact with the consent validating party server 108. The Pulse Pro App 116 has access to the second party private keys. In addition, the Pulse Pro App 116 provides an end-point to which the first party can submit their new grant transactions, and a front-end for the second party to decrypt, view and (if necessary) revoke any grants that have been given. The second party has the ability to decrypt and validate the first party consent, as well as to digitally sign the first party consent. The resulting grant structure, that has been digitally signed by both the first party and the second party, and that is subsequently stored on the blockchain, cannot be read by any party other than first party and the second party. The present invention therefore eliminates any need to provide additional permission to the first party or the second party to decrypt, view and/or revoke existing grants.

Furthermore, the Pulse Pro App 116 interfaces with the second party's internal processing systems (not shown) function as a consent management tool and to provide details of the granted consents that are available to them as well as the first party information itself. The internal processing systems would then be responsible for processing the first party information. The Pulse Pro App 116 may also provide analytics around the consents that have been granted to the second party. The Pulse Pro App 116 can also be used as a reporting tool, in addition to a consent management tool, to provide reports of the granted consents. In this way, the Pulse Pro App can provide an indication to a user which consents it has been granted, by which users, and the timing of consents received (and consequently of consent expiry). The Pulse Pro App can therefore interact with other applications in some way depending on consents—for example, a targeted advertising application—to ensure that the second party using the Pulse Pro App properly understands the consents granted to them and how they can be used, and also knows how to meet their obligations with respect to these consents.

The consent validating party server 108 comprises a Mid-Tier which in turn comprises a RESTful API. In alternative embodiments, the Mid-Tier may be provided via alternative implementations, e.g. across multiple servers or on a local device. The Mid-Tier isolates the blockchain 110

API from the forward tiers or layers of the consent validating party server 108, keeping the REST API consistent despite changes to the blockchain API. This is advantageous as changes to the blockchain API may be outside of the control of any of the parties involved. The Mid-Tier also provides a more logical REST interface than the Blockchain interface for Pulse and PulsePro clients.

The consent validating party server 108 is configured to perform checks on blockchain transactions to ensure that they are valid prior to submission to the blockchain for storage. Advantageously, this reduces flooding of the blockchain nodes. Additional servers may be added to form part of the Pulse Platform, such that a plurality of servers can then function as a single logical unit, and thereby provide horizontal scaling. In addition, the consent validating party server 108 allows blockchain data to be cached which enables faster data querying. Lastly, the consent validating party server 108 also enables forward tiers to be isolated from delays in publishing a blockchain transaction.

Turning to the blockchain 110, the blockchain 110 functions as long-term data storage for the Pulse Platform. There are several advantages in using a blockchain for this purpose. Firstly, the blockchain provides storage that is resilient and immutable. It also allows the consent validating party to publish the blockchain to the general public to build trust in the Pulse Platform. Any suitable blockchain may be used, e.g. VeChain or Hyperledger. Using blockchain technology, the present approach enables trusted and decentralised management of dynamic consent. The use of a blockchain 110 allows consent information to be maintained with the second party while avoiding the need for a dedicated or centralised third trusted party.

Embodiments of the present invention enable consent decisions to be stored and managed more effectively. The first party grants permission to the second party to process a set range of personal data, which are referred to herein as 'Fields' or 'Field Data', for a defined set of reasons, which are referred to herein as 'Purposes' or 'Purpose Data', for a defined time period. The Pulse App 114 logs and manages the consent data, i.e. the identities of the first party and the second party, the Fields and the Purposes that the consent relates to, and the expiry date of the consent. A blockchain is used to store the consent data, which has the benefit of making grant transactions immutable. Advantageously, the consent data that is stored on the blockchain 110 is encrypted in a way that ensures that the consent data that is stored on the blockchain 110 cannot be read by any party other than the first party, i.e. the grantor of consent, or the second party, i.e. the grantee of consent.

Figure 4:
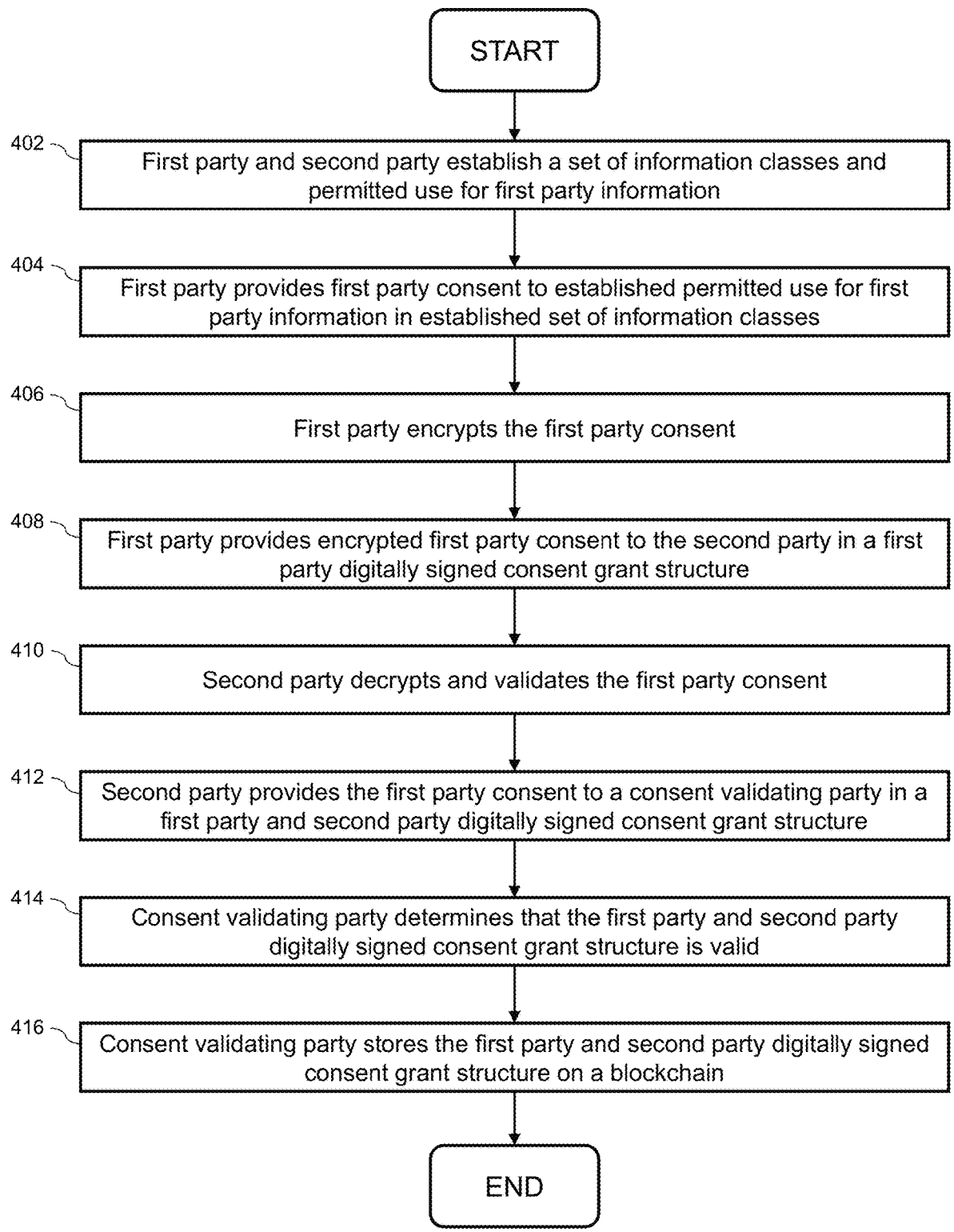
FIG. 4 is a flow diagram showing a method for a first party to control permission for access to first party information to a second party while preserving privacy, in accordance with embodiments of the present invention.

A method according to embodiments of the present invention is outlined in FIG. 4. The method begins when the first party and the second party establish, at Step 402, a set of information classes for first party information to be provided to the second party. The set of information classes may comprise a set range of personal data, namely 'Field Data'. The first party and the second party also establish, as part of Step 402, permitted use for the first party information in the set of information classes. The permitted use may comprise a defined set of reasons, namely 'Purposes'. Next, the first party provides, at Step 404, a first party consent to the permitted use that has been established for the first party information in the established set of information classes, and the first party encrypts, at Step 406, the first party consent for inspection that is limited to the first party and the second party. The first party then provides, at Step 408, the encrypted first party consent to the second party in a first party digitally signed consent grant structure.

Next, after receiving the first party digitally signed consent grant structure from the first party, the second party decrypts and validates, at Step 410, the first party consent that is provided within the first party digitally signed consent grant structure. The second party then provides, at Step 412, the first party consent to a consent validating party in a first party and second party digitally signed consent grant structure.

The consent validating party determines, at 414, that the first and second party digitally signed consent grant structure is valid, and the consent validating party stores, at Step 416, the first and second party digitally signed consent grant structure on the blockchain 110. The resulting first and second party digitally signed consent grant structure that is stored on the blockchain 110 cannot be read by any party other than first party and the second party. The first party, the second party and the consent validating party may perform the above method steps via the first party mobile device 102, the second party server 104, and the consent validating party server 108, respectively.

The above-described method not only protects personal data for which consent is provided by the first party, but also provides data protection and privacy by design by minimising the processing of the first party's personal data. The method also helps to provide data protection and privacy by default by only processing information that is necessary, to an extent that is necessary and only storing data as long as is necessary. Accordingly, the present method enables a first party's information to be stored and accessed securely.

Creation of Transactions

As discussed above, embodiments of the present invention involve storing grant transactions on the blockchain 110. In embodiments, further transactions may also be stored on the blockchain 110. For example, a list of fields may be stored on the blockchain 110 as a field list transaction. A list of purposes may also be stored on the blockchain 110 as a purpose list transaction. In addition, a revoke transaction may be stored on the blockchain 110, where a revoke transaction can be used to revoke or terminate consent that has previously been granted. A field list transaction and a purpose list transaction may be created by the PulsePro App 516. A grant transaction may be created by a front-end user mobile application 712 such as the Journey App 112. A revoke transaction may be created by a front-end user mobile application 712 such as the Journey App 112 or the Pulse App 114. The creation of each of a field list transaction, a purpose list transaction, a grant transaction and a revoke transaction are discussed in further detail below with reference to FIGS. 5 to 8.

Creation of a Field List Transaction

Figure 5:
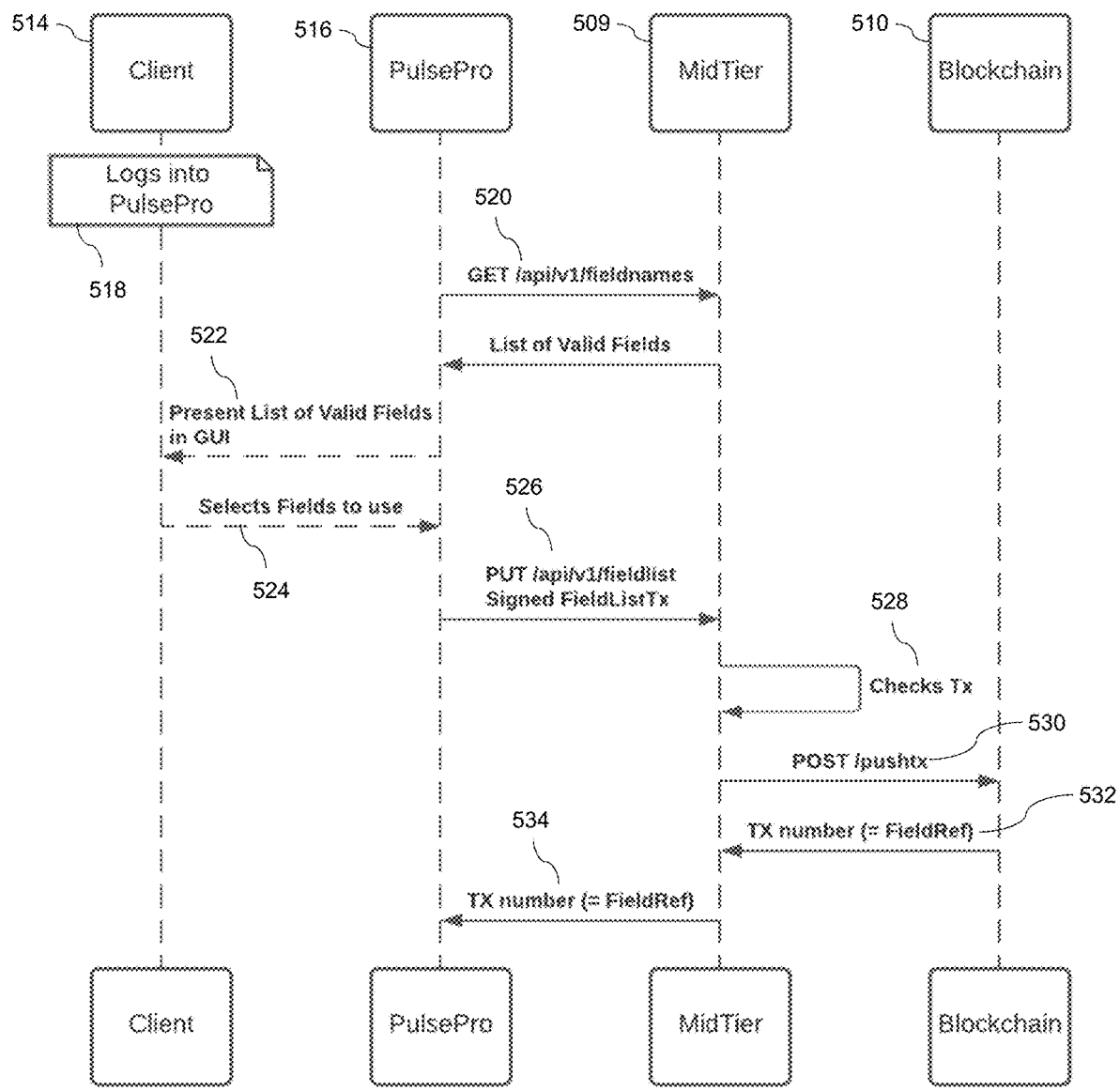
FIG. 5 is a sequence diagram showing the process for creating a field list transaction, in accordance with an embodiment of the present invention.

Turning to FIG. 5, the process for creating a field list transaction is shown. Creation of a field list transaction involves a client 514, which is analogous to the second party, the PulsePro App 516 of the second party, the Mid-Tier 509 of the consent validating party, and the blockchain 510. A field list transaction stores a package of fields, such as 'First Names', 'Surname', 'Nationality', 'Bank Transactions' etc., onto the blockchain 510. Consent can be provided by the first party to the second party to process the fields contained in the field list transaction. A field list transaction is created by the PulsePro App 516 using input from the client 514 regarding which fields to use. The field list transaction once created and checked is stored on the blockchain 510, after which the transaction number of the field list transaction is returned to the PulsePro App 516 such that it can be viewed by the second party.

The process begins by the client 514 logging into the PulsePro App 516 at Step 518. A list of valid fields is stored in the Mid-Tier 509 by the consent validating party. The PulsePro App 516 then fetches, at Step 520, the list of valid fields from the Mid-Tier 509 and presents, at Step 522, the list of valid fields to the client 514 via the graphical user interface (GUI) of the client device. The client 514 then selects, at Step 524, the fields to be used from the list of valid fields. Once the fields to be used have been selected by the client 514, the PulsePro App 516 submits, at Step 526, a digitally signed field list transaction (Signed FieldList Tx). The digital signature on the signed field list transaction approves the loading of the transaction onto the blockchain.

Next, the Mid-Tier 509 checks, at Step 528, the signed field list transaction. In particular, the Mid-Tier 509 checks the signed field list transaction to ensure that the signature has been applied by an approved party. The Mid-Tier 509 also checks whether the number of fields in the field list exceeds a maximum threshold, e.g. the Mid-Tier 509 checks that there are no more than 64 fields in the field list. Thirdly, the Mid-Tier 509 checks to ensure that the field names provided match those in the master database of the Mid-Tier 509.

Once the signed field list transaction has been checked by the Mid-Tier 509, the signed field list transaction is posted, at Step 530, for storage on the blockchain 510. The blockchain 510 then returns, at Step 532, a transaction number associated with the signed field list transaction to the Mid-Tier 509, and the Mid-Tier 509 subsequently forwards, at Step 534, the transaction number to the PulsePro App 516. Once the field list transaction has been created and stored on the blockchain 510, the first party is able to provide consent to the second party to process the fields that are contained within the field list transaction.

Creation of a Purpose List Transaction

Figure 6:
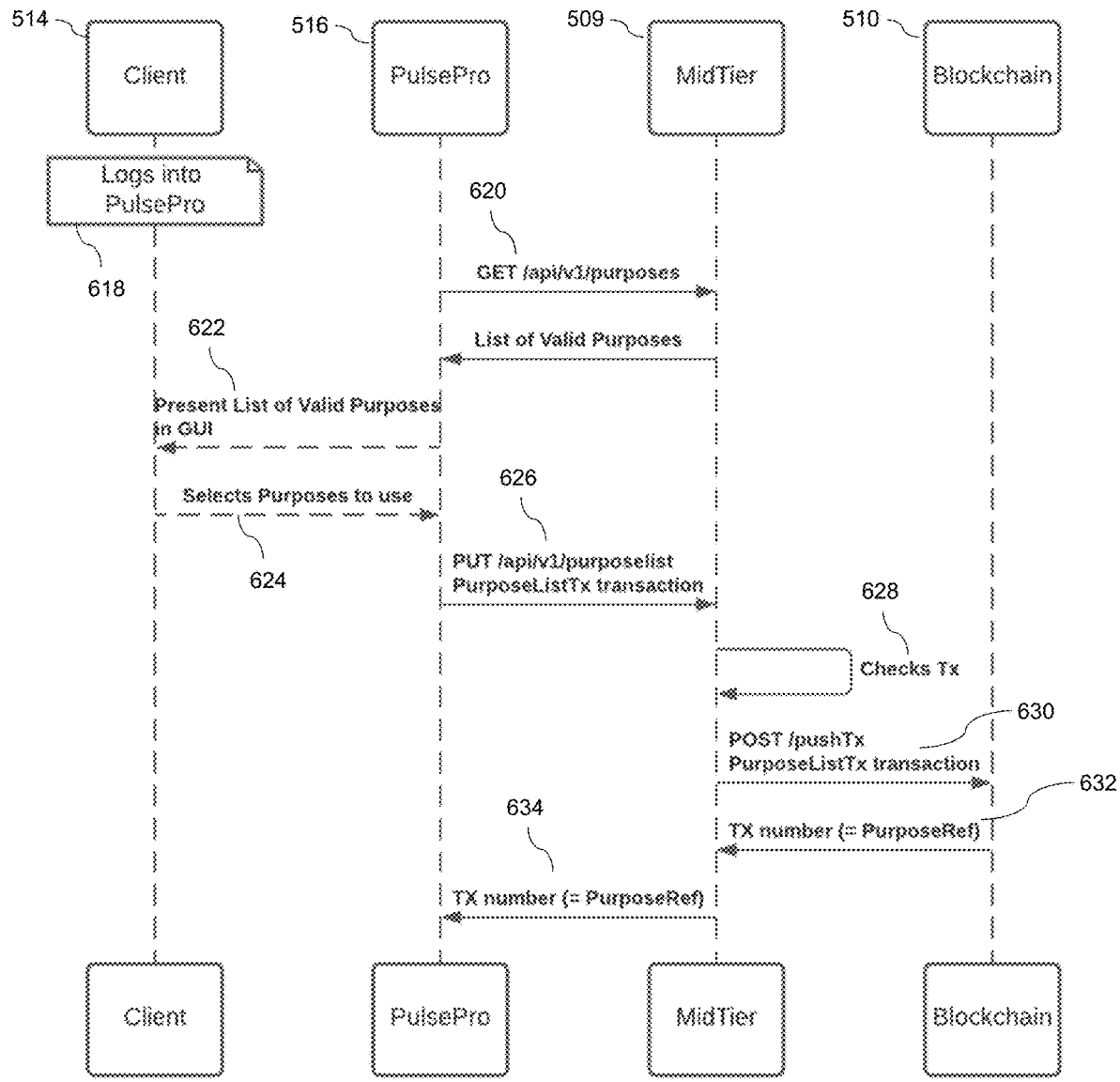
FIG. 6 is a sequence diagram showing the process for creating a purpose list transaction, in accordance with an embodiment of the present invention.

FIG. 6 shows the process for creating a purpose list transaction by the PulsePro App 516. A purpose list transaction stores onto the blockchain 510 a package of purposes that can be consented to by the first party, for example 'Email Marketing', 'SMS Marketing', 'User Tracking', etc. A purpose list transaction is created by the PulsePro App 516 using input from the client 514 regarding which purposes to use. The purpose list transaction once created and checked is stored on the blockchain 510, after which the transaction number of the purpose list transaction is returned to the PulsePro App 516 such that it can be viewed by the second party.

The process begins by the client 514 logging into the PulsePro App 516 at Step 618. A list of valid purposes is stored in the Mid-Tier 509 by the consent validating party. The PulsePro App then fetches, at Step 620, the list of valid purposes from the Mid-Tier and presents, at Step 622, the list of valid purposes to the client 514 via the graphical user interface (GUI) of the client device. The client 514 then selects, at Step 624, the purposes to be used from the list of valid purposes. Once the purposes to be used have been selected by the client 514, the PulsePro App 516 submits, at Step 626, a digitally signed purpose list transaction (Signed PurposeList Tx). The digital signature on the signed purpose list transaction approves the loading of the transaction onto the blockchain 510.

Next, the Mid-Tier 509 checks, at Step 628, the signed purpose list transaction. In particular, the Mid-Tier 509 checks the signed purpose list transaction to ensure that the signature has been applied by an approved party. The Mid-Tier 509 also checks whether the number of purposes in the purpose list exceeds a maximum threshold, e.g. the Mid-Tier 509 checks that there are no more than 64 purposes in the purpose list. Thirdly, the Mid-Tier 509 checks to ensure that the purpose names provided match those in the master database of the Mid-Tier 509.

Once the signed purpose list transaction has been checked by the Mid-Tier 509, the signed purpose list transaction is posted, at Step 630, by the Mid-Tier 509 for storage on the blockchain 510. The blockchain 510 then returns, at Step 632, a transaction number associated with the signed purpose list transaction to the Mid-Tier 509, and the Mid-Tier 509 subsequently forwards, at Step 634, the transaction number to the PulsePro App 516. Once the purpose list transaction has been created and stored on the blockchain 510, the first party is able to provide consent to the second party to process data for the purposes that are contained within the purpose list transaction.

Creation of a Grant Transaction

Figure 7:
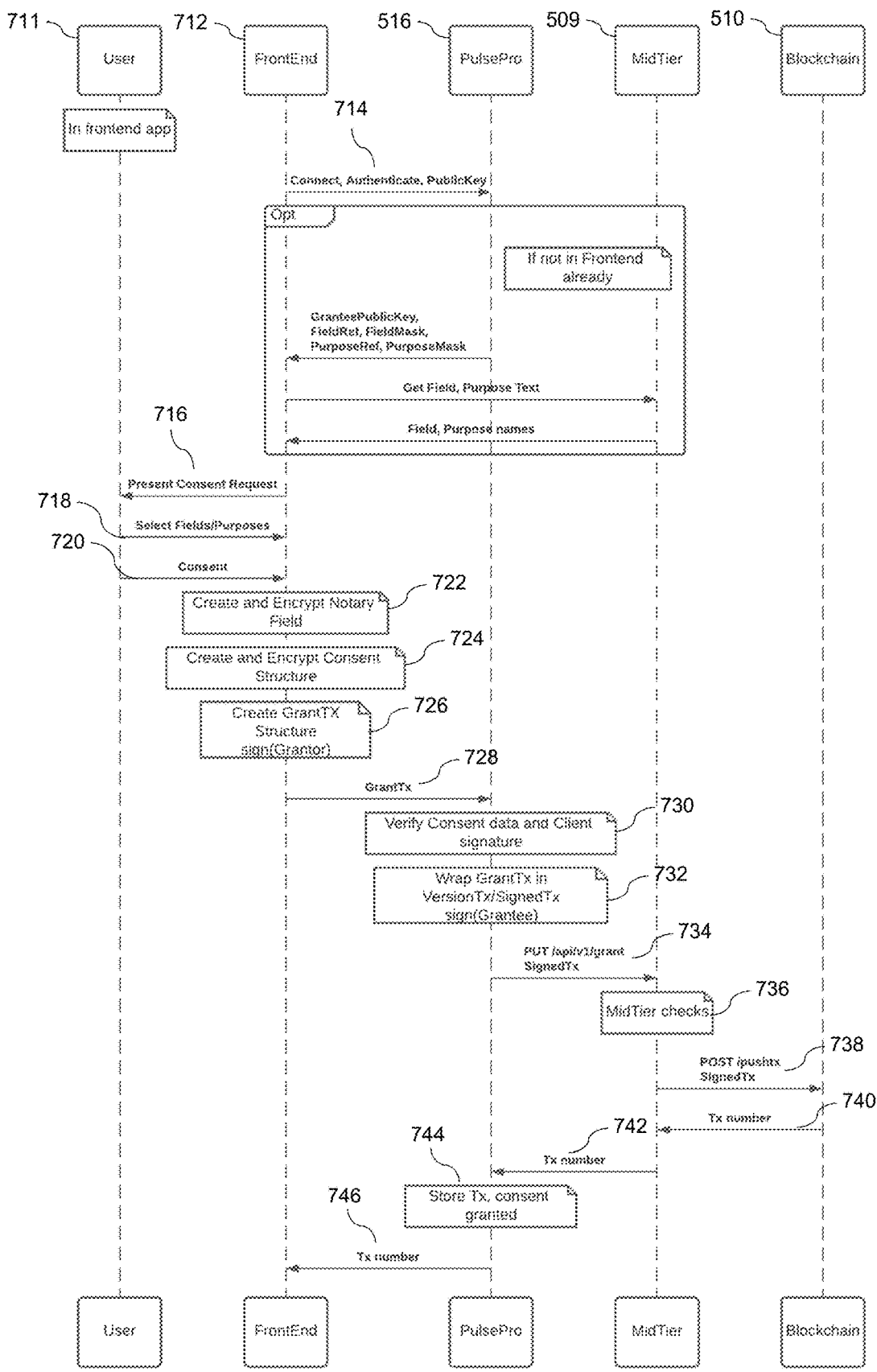
FIG. 7 is a sequence diagram showing the process for creating a grant transaction, in accordance with an embodiment of the present invention.

Turning to FIG. 7, the process for creating a grant transaction is shown. A grant transaction is created, encrypted and signed by the first party on the first party device before being forwarded to the second party for a second digital signature and submission to the blockchain 510. In FIG. 7, the first party is represented by a user 711. The user 711 has access to a front-end application 712 on a user device, which is analogous to the first party device.

As a first step, the front-end application 712 connects, at Step 714, with the PulsePro App 516. Authentication between the user device and the PulsePro App 516 is provided. Field and public key data may be pre-loaded in the front-end application 712 prior to the grant being created, e.g. at the time of building the front-end application 712, in order to save retrieving the information in real time. Optionally, if the field and public key data are not already accessible by the front-end application 712, these entities may be obtained from the Mid-Tier 509. The fields and/or purposes can be obtained from the PulsePro App 516. In addition, the field list transaction and/or the purpose list transaction numbers may be obtained from the PulsePro App 516 if not already available at the front-end application 712.

Once the front-end application 712 is connected to the PulsePro App 516, and the fields and purposes are available at the front-end application 712, the front-end application 712 presents, at Step 716, a consent request to the user 711 via a GUI whereby the consent request includes options to select fields and purposes for which the consent is to be provided. The user 711 then selects, at Step 718, the fields and purposes for which consent is to be provided. The user 711 also confirms, at Step 720, that consent is to be provided.

Once the selection of fields and purposes and the confirmation of consent is received by the front-end application 712, the front-end application 712 creates and encrypts, at Step 722, a notary structure. The purpose of the notary structure is to store a collection of fields around the transaction that can be used in the event that a grant is disputed to confirm the timing and location of the grant transaction. The front-end application 712 also creates and encrypts, at Step 724, a consent structure. The consent structure holds the details of a data grant between the user 711 and the client 514, i.e. the consent data. The front-end application 712 then creates, at Step 726, a grant transaction (Grant Tx) which includes the notary structure and the consent structure.

The front-end application 712 then digitally signs the grant transaction as the grantor to generate a digitally signed grant transaction (Signed Grant Tx), also referred to herein as a digitally signed consent grant structure, or a first party digitally signed consent grant structure. The digital signature on the signed grant transaction approves the loading of the transaction onto the blockchain 510.

Next, the front-end application 712 sends, at Step 728, the digitally signed consent grant structure to the Pulse Pro App 516.

The PulsePro App 516, after receiving the digitally signed consent grant structure, verifies, at Step 730, the consent data within the consent structure and the signature. The PulsePro App 516 then wraps, at Step 732, the consent grant structure in a versioned transaction structure, wherein the versioned transaction structure has a version number, and signs the wrapped structure as the grantee to result in a signed transaction structure. Wrapping the consent grant structure in a versioned transaction structure in this way is useful when amending a grant structure (e.g. by revoking the grant structure and creating a new grant structure with amended features). It allows the grant structure definition to be changed, such that fields within the grant structure can change meaning or be deleted, or such that new structure types can be added. The version number indicates the version of the protocol and allows the change to the be made iteratively. For example, the Mid-Tier may be updated from supporting version one of the protocol to supporting versions two and three of the protocol, and clients may switch to a new version once ready or once they have been upgraded to use the new version. The versioning of structures can be applied in a similar manner to revoke, field list and purpose list transaction structures. The PulsePro App 516 sends, at Step 734, the signed transaction structure to the Mid-Tier 509.

The Mid-Tier 509 performs, at Step 736, a number of checks on the signed transaction prior to sending it to the blockchain 510. As part of this process, the Mid-Tier 509 checks to ensure that the signatures are valid. The Mid-Tier 509 also checks to ensure that the grantee is on the list of approved submitters to the blockchain 510.

Once the Mid-Tier 509 has completed the checks, the signed grant transaction is posted, at Step 738, by the Mid-Tier 509 for storage on the blockchain 510. The blockchain 510 then returns, at Step 740, a transaction number or hash associated with the signed grant transaction to the Mid-Tier 509, and the Mid-Tier 509 subsequently forwards, at Step 742, the transaction number to the PulsePro App 516. The Pulse Pro App 516 stores, at Step 744, the transaction number and consent is then granted. The Pulse Pro App 516 also sends, at Step 746, the transaction number to the front-end application 712 such that it is then viewable by the user 711.

As discussed above, the notary structure and the consent structure are encrypted by the front-end application 712. The notary structure can be decrypted and read by the grantor, whereas the consent structure can be decrypted and read by the grantee. The notary structure can also be decrypted and read by the Mid-Tier 509; however, the Mid-Tier 509 cannot decrypt and read the consent structure that contains the notary structure. This feature provides an advantage in that in certain instances it may be useful for the Mid-Tier 509 to manually analyse the contents of the consent structure—when required, the grantee can decrypt the consent structure and subsequently forward the notary structure to the Mid-Tier 509, the consent structure that is contained within the notary structure being in a format that is readable by the Mid-Tier 509. Such a feature may be useful for example in the event of a dispute concerning the granted consent.

It should be noted that the consent structure cannot be decrypted and read by the Mid-Tier 509, the blockchain 510, or the general public as a result of its encryption. Advantageously, this provides privacy-by-design.

Creation of a Revoke Transaction

Figure 8:
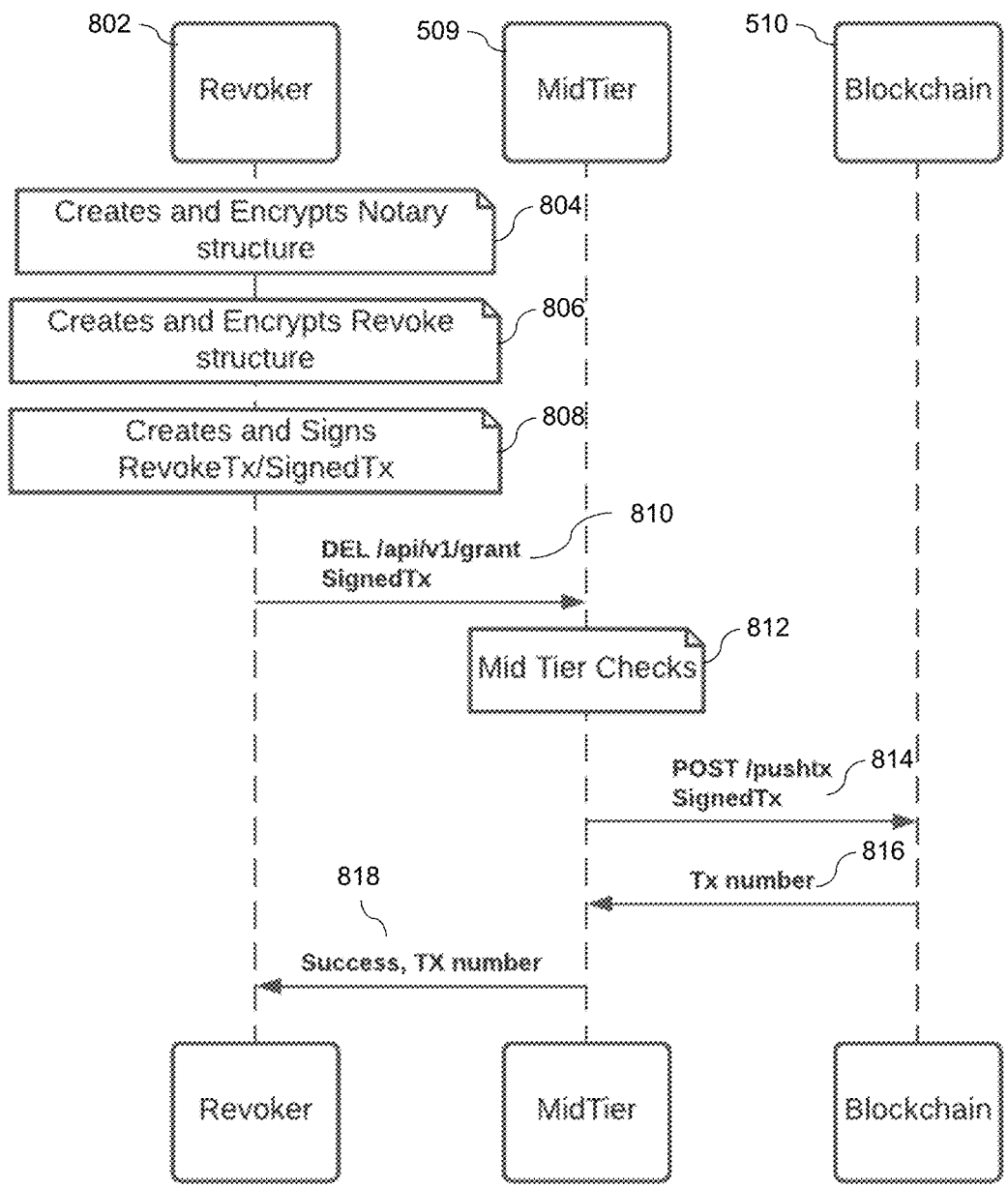
FIG. 8 is a sequence diagram showing the process for creating a revoke transaction, in accordance with an embodiment of the present invention.

The process of creating a revoke transaction is shown in FIG. 8. A revoke transaction is used to revoke or terminate consent that has previously been granted. Both the first party and the second party, namely the grantor and the grantee of the previously granted consent, are able to revoke or terminate the consent via a Revoker 802. As such, the Revoker 802 may be included in either the Pulse Pro App 516 or the front-end application 712, and both are equipped to create a revoke transaction. The revoke transaction structure can be placed onto the blockchain 510.

The process of creating a revoke transaction begins when the Revoker 802 creates and encrypts, at Step 814, a notary structure. The Revoker 802 then creates and encrypts, at Step 806, a revoke structure. Subsequently, the Revoker 802 creates and signs, at Step 808, a revoke transaction to form a signed revoke transaction. The Revoker 802 then sends, at Step 810, the signed revoke transaction to the Mid-Tier 509 such that the Mid-Tier 509 can then perform checks on the signed revoke transaction as appropriate.

The Mid-Tier 509 performs, at Step 812, a number of checks on the signed revoke transaction prior to sending it to the blockchain 510. As part of this process, the Mid-Tier 509 checks to ensure that the signatures are valid. The Mid-Tier 509 also checks to ensure that the grantee is on the list of approved submitters to the blockchain 510. The Mid-Tier 509 also checks that the public key matched to the signed revoke transaction is either the grantee or grantor key from the original grant transaction.

Once the Mid-Tier 509 has completed the checks, the signed revoke transaction is posted, at Step 814, for storage on the blockchain 510. The blockchain 510 then returns, at Step 816, a transaction number associated with the signed revoke transaction to the Mid-Tier 509, and the Mid-Tier 509 subsequently forwards, at Step 818, the transaction number to the Revoker. The Revoker stores the transaction number and the consent is then revoked.

Amendment of a Grant Transaction

As well as creating new grants and revoking existing grants, the first party may amend an existing grant via the Pulse App 114 on a first party device. For example, an existing grant can be amended by extending it, or turning fields and purposes on and off. An amendment of an existing grant is performed by revoking the existing grant and then reposting as a new grant. Thus, amendment of a grant can be carried out by creating a revoke transaction and then a new grant transaction including the amendments, where the revoke and grant transactions are created as described above with reference to FIGS. 8 and 7, respectively.

Blockchain Data Structures

The data structures that are passed between components of the system are discussed in further detail below. Each structure may be presented in a Pseudo Structure form and an Array form. The Array form of the structure can be converted into Recursive Length Prefix (RLP) format for storage on the blockchain.

Signature Structure

A signature structure holds a single elliptic curve signature.

Notary Structure

A notary structure is included in a grant transaction, whereby the grant transaction is originated by the front-end application 712. The purpose of the notary structure is to store a collection of fields around the transaction that can be used in the event that a grant is disputed, to confirm the timing and location of the grant transaction. For example, the notary structure may comprise the login name or other identities/public keys that were authenticated with the second party. The notary structure may comprise device identifiers such as Phone IMEI, IP address, MAC address, phone model & operating system, and/or phone user, and/or temporal data such as date and time, GPS location, application name creating the notary, and/or application version. The notary structure may be in the form of key/value pairs.

When used, the notary structure will be encrypted twice, so that the only person who has access to read it in normal usage is the first party who submitted the grant. It requires co-operation between the second party and the consent validating party for any other party to read the data.

Consent Structure

The consent structure is used to store the details of a grant between a grantee (first party, user) and grantor (second party, client). The consent structure includes encrypted notary data, the consent validating party public key used to create the AES key, the first party public key used to create the notary AES key, the time the grant is valid from and the time the grant is valid to, the blockchain transaction number of the relevant field list transaction, the mask indicating which fields can be approved, the blockchain transaction number of the relevant purpose list transaction, and the mask indicating which purposes are approved.

The notary data is converted to RLP before being encrypted such that only the first party and the consent validating party can decrypt it.

Revoke Structure

A revoke structure is used to store data relating to a request to revoke a consent that has already been granted. The revoke structure may be created by either the grantor or grantee of the original grant. The revoke structure includes encrypted notary data, the consent validating party public key used to create the AES key, the first party public key used to create the notary AES, the time that the grant is valid from, and the blockchain transaction number of the grant being revoked.

The notary data is converted to RLP before being encrypted such that only the first party and the consent validating party can decrypt it.

Grant Transaction Structure

The grant transaction structure or 'grant transaction' is one of the four supported transaction types that are currently able to be placed onto the blockchain 110, 510. The grant transaction is created, encrypted and signed by the grantor (first party, user) on their device before being forwarded to the grantee (second party, client) for a second signature and submission to the blockchain 110, 510.

The grant transaction therefore comprises a consent field which is encrypted so that only the grantor and the grantee can decrypt it, the public keys that can be used to create the AES key encrypting the Consent data if the relevant private key is held, and a grantee signature.

Revoke Transaction Structure

The revoke transaction structure or 'revoke transaction' is one of the four supported transaction types that are currently able to be placed onto the blockchain 110, 510. The Revoke transaction is created and encrypted by either the grantor or the grantee, and it does not need two signatures.

The revoke transaction includes the type of transaction, the blockchain transaction number of the grant to be revoked, a revoke field that is encrypted so that only the grantor and the grantee can decrypt it, and the public keys that can be used to create the AES key encrypting the Revoke data if the relevant private key is held.

Field List Transaction Structure

The field list transaction structure or 'field list transaction' is one of the four supported transaction types that are currently able to be placed onto the blockchain 110, 510. A field list transaction stores onto the blockchain a package of fields that can be consented to be processed by a user, for example 'First Names', 'Surname', 'Nationality', 'Bank Transactions' etc.

Accordingly, the field list transaction includes a type field to indicate the type of transaction, the language used for the field names, the field ID and field name. The field ID is a canonical identifier for a field, and the name is included in the structure as an error check. A list of valid language codes and a list of valid field ID and field name pairs for a given language can be retrieved from the Mid-Tier 509.

The list of valid field names is held centrally by the consent validating party, with translations into multiple languages. Field packages identifiers are more compact to store on the blockchain than a list of field names in the grant transaction. It also simplifies translation to other languages, and ensures that data names are consistent between different applications, e.g. 'First Names' in all cases, not 'Forenames', 'Given Name' etc.

Purpose List Transaction Structure

A purpose list transaction structure or 'purpose list transaction' is one of the four supported transaction types that are currently able to be placed onto the blockchain. A purpose list transaction stores onto the blockchain a package of purposes that can be consented to by a user, for example 'Email Marketing', 'SMS Marketing', 'User Tracking', etc.

Accordingly, the purpose list transaction includes a type field to indicate the type of transaction, the language used for the field names, the purpose ID and purpose name. The purpose ID is a canonical identifier for a purpose, and the name is included in the structure as an error check. A list of valid language codes and a list of valid purpose ID and field name pairs for a given language can be retrieved from the Mid-Tier 509.

The list of valid purposes is held centrally by the consent validating party, with translations into multiple languages. Purpose packages are more compact to store on the blockchain than a list of strings in a grant transaction. It also simplifies translation to other languages, and it ensures that purposes are consistent between different clients.

Versioned Transaction Structure

A versioned transaction structure or 'versioned transaction' is a wrapper for any of the blockchain transaction structures (grant transaction, revoke transaction, field list transaction, purpose list transaction). In addition, the versioned transaction includes a blockchain API version number. This enables breaking changes/enhancements to be made to the API by incrementing the version number for the new structures.

Signed Transaction Structure

A signed transaction structure is the structure that is persisted on the blockchain. A signed transaction comprises a versioned transaction (which may comprise a grant transaction, revoke transaction, field list transaction or purpose list transaction), and a signature approving the loading of the signed transaction onto the blockchain 110, 510.

Cryptographic Approach

A variety of cryptographic methods are used in embodiments of the present invention to ensure that different components are able to share data securely. Elliptic curve cryptography is used for asymmetric encryption using a public/private key approach, and this approach is also used for the related problem of digital signatures. A particular feature of embodiments is the requirement to maintain privacy of particular data to two parties—the first party and the second party in respect of a consent structure, and the first party and the consent validating party in respect of a notary structure. Privacy is maintained by using a hybrid model involving symmetric encryption, with Diffie-Hellman key exchange used to allow each party to determine the key for the symmetric encryption algorithm. As this approach does not rely on a secure channel, where the parties are not in direct contact during the process—such as the first party and the consent validating party, who need not interact directly during a grant of consent, for example—the relevant information for the Diffie-Hellman key exchange may be provided in advance of its first use (it may even be pre-installed in the front-end application, for example).

The following set of cryptographic primitives are used in particular embodiments.

Hash Algorithm

The Hash function may comprise the Keccak-256 hash function. The Keccak-256 hash function is applied to a structure in order to calculate hash values. The Keccak functions are very secure, and were standardised by NIST as the SHA-3 standard in 2015. The Keccak-256 hash function uses 256 bit, which is in preference to a 384/512 bit version as it still provides excellent security whilst requiring less data to store on the blockchain compared to the longer variants. In addition, both the Symmetric and Asymmetric encryption algorithms use a 256 bit key length. Using the Keccak-256 hash function therefore provides a key length that is consistent with that of the Symmetric and Asymmetric encryption algorithms. In other embodiments, a key length that is different to that of the encryption algorithms may be used.

Symmetric Encryption

Symmetric encryption is performed using the Advanced Encryption Standard (AES) cipher with Galois Counter Mode for Authenticated Encryption. AES provides security benefits and is widely implemented, with hardware support on many modern processors (Arm, Intel etc.). Authenticated Encryption provides defenses against Oracle-type attacks.

The key length may be 256 bits, which provides more security in comparison to 128 bit keys. In addition, for hybrid symmetric/Asymmetric encryption schemes, the 256 bit key is generated by the Diffie-Hellman output from the secp256k1 key exchange, which advantageously simplifies implementation.

Digital Signatures

For digital signatures, the secp256k1 Elliptic curve may be used with an Elliptic Curve Digital Signature Algorithm (ECDSA). Elliptic Curve based public key schemes are faster to calculate than other schemes (RSA, Log based Diffie-Hellman etc.), and are able to achieve equivalent security to other schemes with shorter key lengths. The secp256k1 Elliptic curve is particularly efficient.

Digital signatures are calculated on the Hash of the data to be signed. The output is a two or three element structure or array with fields 'r', 's' and optionally a recovery parameter. 'r' and 's' are 256 bit values, while the recovery parameter is generally stored as a single byte.

Asymmetric/Public Key Encryption

A hybrid encryption scheme is used to encrypt data using an public/private key scheme, by which data is encrypted with Symmetric (AES) encryption, and an Elliptic curve is used to encrypt the AES key. An Elliptic Curve Diffie Hellman (ECDH) exchange is used to generate a suitable key for the AES encryption. Data may be encrypted such that both the Grantee and the Grantor can read it.

Key Ratcheting and Storage

There is a fundamental tension between the requirement to keep first party data secret, and the use of a public blockchain to store the first part data. Embodiments of the present invention resolve this problem by using strong encryption methods to ensure that any personal data on the blockchain is not readable to anyone who does not have the relevant keys.

In embodiments, public keys may be used as identifiers such that a particular blockchain transaction can be retrieved using the public key that was used to sign it. Each transaction may be signed by a different public key in order to preserve privacy, such that a third-party observer of a blockchain is not able to decipher whether or not two transactions have been signed by the same entity.

In embodiments, fresh keys may be used for each transaction whilst minimising the storage requirements of the Pulse App 114, or the Pulse Pro App 116, 516, particularly in secure key stores. Embodiments of the present invention also support forward secrecy such that if an adversary is able to break one key from the blockchain 110, 510, this would not enable them to quickly break the other keys belonging to the same person.

According to some embodiments, the first party uses a plurality of private keys for encrypting the first party consent and for digital signing a consent grant structure. Each of the plurality of private keys may be generated by an iterative process from an original master private key. An original master private key may be created as a single key, or by generating two keys and linking the two keys together. The original master private key may be created as a single 512 bit number. Alternatively, two 256 bit keys (e.g. secp256k1 curve) may be generated and linked together to form the 512 bit master private key.

A private key may be generated from a preceding private key by splitting the preceding private key into a first part and a second part, and by performing a first process to generate the first part of the private key and a second process to generate the second part of the private key. For example, the first process may be an XOR of the first part and the second part of the preceding master private key followed by a hash of the XOR. One of the first process and the second process may be an XOR of the first part and the second part of the preceding master private key followed by a hash of the XOR, and the other of the first process and the second process may be a hash of the first part or the second part of the preceding master private key. Private keys may be generated after a consent event, such that each key is unique for each transaction. As such, the Mid-Tier may search for a transaction by specifying the key in order to return and query transaction keys and transactions.

As a specific example, using the original master private key, which is referred to herein as 'master key' for simplicity, a series of 256 bit keys may be generated from the 512 bit master key using a process called key ratcheting. The series of 256 bit keys may be generated such that they appear independently of each other. Key ratcheting begins by the 512 bit master key being split into two 256 bit keys (A[n] and B[n]). A value for A[n+1] is then calculated as Keccak256(A[n] XOR B[n]), where A[n+1] is the next private key. A value for B[n+1] is calculated as Keccak256(B[n]). The matching public key can be calculated from the private key (A[n+1]). This process can be repeated iteratively to generate a plurality of private keys.

Figure 9:
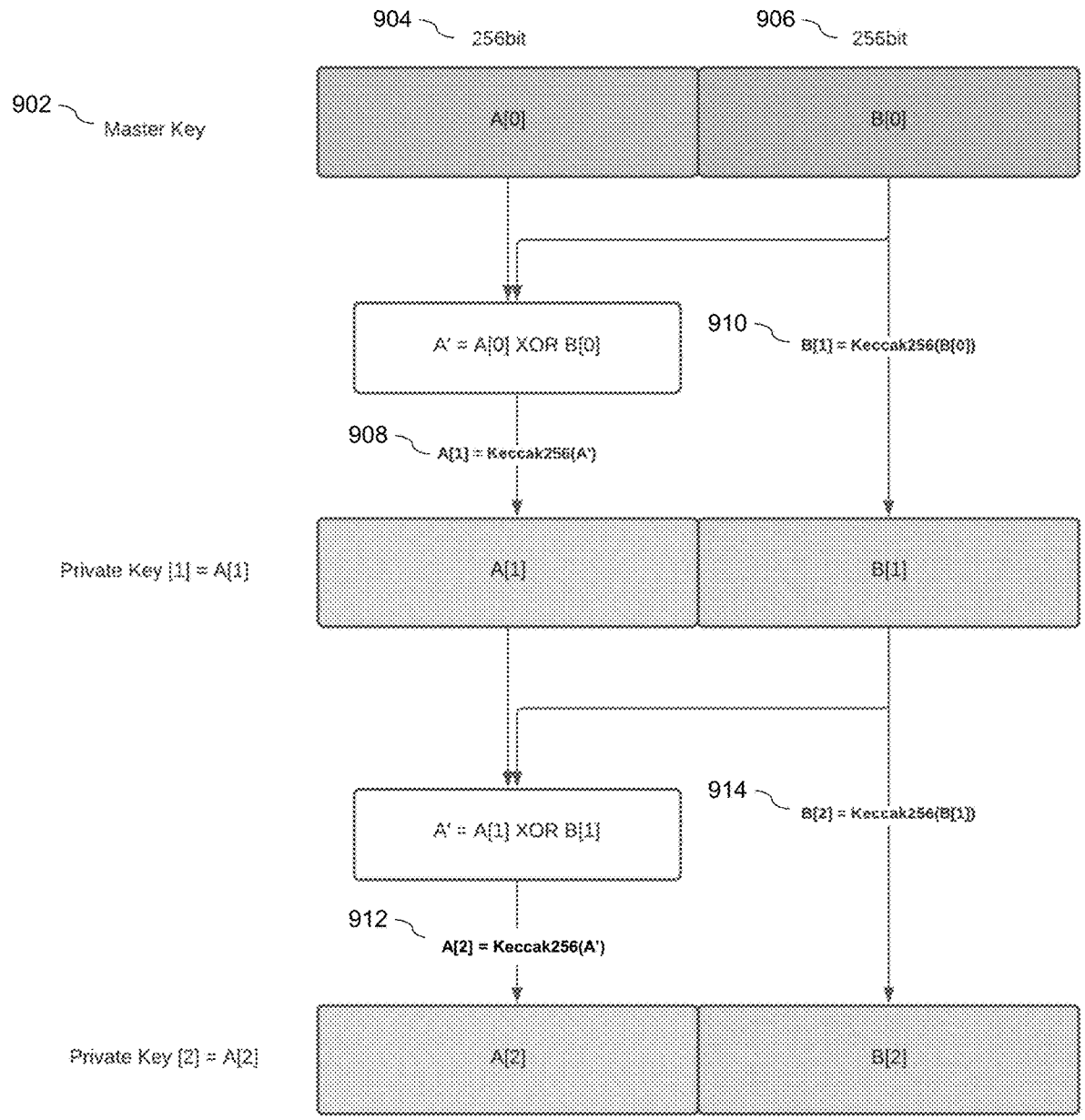
FIG. 9 is a block diagram demonstrating a key ratcheting operation, in accordance with an embodiment of the present invention.

The key ratcheting process is described in further detail below with reference to the embodiment shown in FIG. 9. The embodiment shown in FIG. 9 illustrates a plurality of 256 private keys being generated by an iterative process from a 512 bit master key 902. The series of 256 bit keys are generated such that they appear independently of each other. Firstly, the 512 bit master key 902 is split into two 256 bit keys (A[0] and B[0]) 904, 906. In order to generate the next private key, A[1] 908, a value for A[1] 908 is calculated using A[0] and B[0] as Keccak256(A[0] XOR B[0]). A value for B[1] 910 is calculated using B[0] as Keccak256(B[0]). The next private key is then generated as secp256k1(A[1]). The matching public key can be calculated from the next private key. Optionally, other public keys may be retained within the PulsePro App 516.

To generate a further private key, A[2] 912, a value for A[2] 912 is calculated as Keccak256(A[1] XOR B[1]). A value for B[2] 914 is calculated as Keccak256(B[1]). The next private key is generated as secp256k1(A[2]). The matching public key can be calculated from the next private key. This process can be repeated iteratively to generate further private keys, A[3], A[4], A[5] etc.

The chain or series of private keys may comprise a singly-linked list, where hash functions may be used as one-way trapdoor functions, so that the list cannot become doubly-linked.

In the first party app, the persisted keys may be stored in a suitable repository. Examples of suitable repositories includes iCloud keychain, Chrome keychain, 1 Password (or any similar password manager), Cloud Storage drive (Dropbox, Google-Drive, iCloud Drive, MS Cloud drive, etc.) with a password keyed encryption. The chosen storage method may provide portability across devices. In the PulsePro App 516, the key may be tied tightly to a device, and the key may be stored in a suitable keychain, hardware security module or password manager.

In order to generate a grant transaction (e.g. embodiment shown in FIG. 7), the user/grantor device creates three keys: 1) ECDH key for the notary structure; 2) ECDH key for the consent structure; and 3) ECDSA key for the grantor signature. Therefore, for each grant transaction, the key ratcheting process is run multiple times until three keys are obtained.

In order to generate a revoke transaction (e.g. embodiment shown in FIG. 8), the revoker device creates the following three keys: 1) ECDH key for the notary structure; 2) ECDH key for the revoke structure; and 3) ECDSA key for the revokee signature. Therefore, the key ratcheting process is run multiple times until three keys are obtained as required for the revoke transaction.

For both grant and revoke transactions, the ratcheting process may be run three times to achieve a total of four keys: the master key, a first ratchet generated key, a second ratchet generated key and a third ratchet generated key. The third ratchet generated key may then be discarded as a total of three keys is required for the grant and revoke transactions. By using a consistent 3-cycle ratcheting process, it is possible to more rapidly generate keys to search for transactions, as a signature key is used every three cycles, and to query in bulk. The revokee signature is not required for authorisation, but it provides a lookup value that can be used to work out which other keys in the chain were used for the lookup value.

In the PulsePro App 516, keys are ratcheted twice for each transaction. For a grant transaction, two keys are required: 1) ECDH key for the consent structure; and 2) ECDSA key for the grant transaction signature. For a revoke transaction, the following two keys are required: 1) ECDH key for the notary and revoke structures (where the ECDH key may be reused for both the notary and revoke structures; it should be noted however that in embodiments where the revoker is based on the PulsePro App 516 the notary structure may be empty); and 2) ECDSA key for revokee signature. The ECDSA key for the grant transaction signature is the second ratchet to allow for faster searching (every other ratchet). The ECDSA key can be used to search for a revoke transaction and to confirm which key in the chain is the relevant ECDH key for the notary or revoke structures. For revoke transactions, the second party's public key on the consent structure may be reused for the public key on the revoke structure.

Many modifications may be made to the specific embodiments described above without departing from the spirit and scope of the invention as defined in the accompanying claims.

Features of one embodiment may also be used in other embodiments, either as an addition to such embodiment or as a replacement thereof.

What is claimed is:

1. A computer-implemented method for a grantor to control permission for access to grantor information to a grantee while preserving privacy and enabling grantor control of grantor information to be processed, the method comprising the following steps taken by the grantor at a computing apparatus of the grantor:
    establishing with the grantee a set of information classes for grantor information to be provided to the grantee and establishing permitted use for the grantor information in the set of information classes;
    providing a grantor consent to the permitted use for the grantor information in the set of information classes;
    encrypting the grantor consent for inspection limited to the grantor and the grantee; and
    providing the encrypted grantor consent to the grantee in a grantor digitally signed consent grant structure for the grantee to decrypt, validate and sign the grantor consent and for a consent validating party to store the grantor and grantee digitally signed consent grant structure on a blockchain, wherein the consent grant structure comprises the consent to the permitted use for the grantor information in the set of information classes.

2. The method of claim 1, wherein the set of information classes and the permitted use are established in an application on the grantor computing device relating to provision of goods or services by the grantee.

3. The method of claim 2, wherein the application on the grantor computing device relates to provision of goods or services by multiple grantees, and the determination of the set of information classes and the permitted use relates to use by multiple grantees.

4. The method as claimed in claim 1, further comprising the grantor providing a revoke grant structure revoking the consent grant structure, wherein the revoke grant structure identifies the consent grant structure and is encrypted by the revoking party for inspection limited to the grantor and the grantee and is digitally signed by the revoking party.

5. The method as claimed in claim 1, wherein encrypting data for inspection limited to the grantor and grantee comprises establishing a symmetric key for use by the grantor and the grantee using elliptic curve Diffie-Hellman key exchange.

6. The method as claimed in claim 1, wherein the grantor uses a plurality of private keys for encrypting and digital signing.

7. The method of claim 6, wherein each of the plurality of private keys is generated by an iterative process from an original master private key.

8. The method of claim 7, wherein a private key is generated from a preceding private key by splitting the preceding private key into a first part and a second part, and by performing a first process to generate the first part of the private key and a second process to generate the second part of the private key.

9. The method of claim 8, wherein one of the first process and the second process is an XOR of the first part and the second part of the preceding master private key followed by a hash of the XOR, and wherein the other of the first process and the second process is a hash of the first part or the second part of the preceding master private key.

10. The method of claim 5, further comprising regenerating private keys after the consent event, determining corresponding public keys from the private keys, and using the determined public keys to identify consent events.

11. The method of claim 1, wherein the consent grant structure further comprises a time of the provision of grantor consent.

12. The method of claim 1, wherein the consent grant structure further comprises a period of time of validity of the grantor consent.

13. A computer-implemented method for a grantee to obtain permission from a grantor for access to grantor information while preserving privacy and enabling grantor control of grantor information to be processed, the method comprising the grantee at a computing apparatus of the grantee:

establishing with the grantor a set of information classes for grantor information to be provided to the grantee and establishing with the grantor permitted use for the grantor information in the set of information classes;

receiving from the grantor a grantor consent to the permitted use for the grantor information in the set of information classes, wherein the grantor consent is encrypted by the grantor for inspection limited to the grantor and the grantee, the encrypted grantor consent being provided in a grantor digitally signed consent grant structure;

decrypting and validating the encrypted grantor consent, and providing the grantor consent to a consent validating party in a grantor and grantee digitally signed consent grant structure, wherein the consent validating party is able to determine that the grantor and grantee digitally signed consent structure is valid, and is further able to store the grantor and grantee digitally signed consent grant structure on a blockchain, wherein the consent grant structure comprises the consent to the permitted use for the grantor information in the set of information classes.

14. The method as claimed in claim 13, further comprising the grantee providing a revoke grant structure revoking the consent grant structure, wherein the revoke grant structure identifies the consent grant structure and is encrypted by the revoking party for inspection limited to the grantor and the grantee and is digitally signed by the revoking party.

15. The method as claimed in claim 13, wherein encrypting data for inspection limited to the grantor and the grantee comprises establishing a symmetric key for use by the grantor and the grantee using elliptic curve Diffie-Hellman key exchange.

16. The method as claimed in claim 13, wherein the grantee uses a plurality of private keys for encrypting and digital signing, the method further comprising regenerating private keys after the consent event, determining corresponding public keys from the private keys, and using the determined public keys to identify consent events.

17. The method of claim 13, wherein the consent grant structure further comprises a time of the provision of grantor consent.

18. The method of claim 13, wherein the consent grant structure further comprises a period of time of validity of the grantor consent.

* * * * *